United States Patent
Sant et al.

(10) Patent No.: US 11,927,953 B2
(45) Date of Patent: Mar. 12, 2024

(54) CUSTOMIZABLE WAYPOINT MISSIONS

(71) Applicant: DJI Research LLC, Palo Alto, CA (US)

(72) Inventors: Rohit Sant, Palo Alto, CA (US); Arnaud Thiercelin, San Francisco, CA (US); Arjun Sukumar Menon, San Jose, CA (US)

(73) Assignee: DJI RESEARCH LLC, Palo Alto, CA (US)

(*) Notice: Subject to any disclaimer, the term of this patent is extended or adjusted under 35 U.S.C. 154(b) by 740 days.

(21) Appl. No.: 17/085,102

(22) Filed: Oct. 30, 2020

(65) Prior Publication Data

US 2021/0064025 A1 Mar. 4, 2021

Related U.S. Application Data

(63) Continuation of application No. 15/967,369, filed on Apr. 30, 2018, now Pat. No. 10,852,724.

(51) Int. Cl.
*G05D 1/00* (2006.01)
*G01C 21/20* (2006.01)
*G01S 17/88* (2006.01)
*G01S 19/13* (2010.01)
*G05D 1/10* (2006.01)

(52) U.S. Cl.
CPC ........... *G05D 1/0044* (2013.01); *G01C 21/20* (2013.01); *G01S 17/88* (2013.01); *G01S 19/13* (2013.01); *G05D 1/101* (2013.01)

(58) Field of Classification Search
CPC ......... G01C 21/20; G01S 17/88; G01S 19/13; G05D 1/0044; G05D 1/101
See application file for complete search history.

(56) References Cited

U.S. PATENT DOCUMENTS

| | | | | |
|---|---|---|---|---|
| 7,711,484 | B2 * | 5/2010 | Hammarlund | G08G 5/0008 342/29 |
| 8,386,097 | B2 * | 2/2013 | de Menorval | G08G 5/0052 340/978 |
| 9,310,222 | B1 * | 4/2016 | Suiter | G08G 5/0091 |
| 9,984,455 | B1 | 5/2018 | Fox | |
| 10,467,913 | B1 * | 11/2019 | Suiter | G08G 5/0021 |

(Continued)

OTHER PUBLICATIONS

Non-Final Office Action for U.S. Appl. No. 15/967,369 dated May 1, 2020, 12 pages.

(Continued)

*Primary Examiner* — Tyler J Lee
(74) *Attorney, Agent, or Firm* — XSENSUS LLP

(57) ABSTRACT

Techniques are disclosed for performing custom waypoint missions using an onboard computing device in communication with a movable object. The movable object can include a flight controller, and a communication system. The flight controller can be in communication with the onboard computing device which includes a processor and an onboard data manager. The onboard data manager can receive at least one input, determine one or more instructions to be performed by the at least one movable object based on the at least one input, generate movement commands to implement the one or more instructions, and send movement commands to the flight controller to be executed.

17 Claims, 11 Drawing Sheets

(56) References Cited

U.S. PATENT DOCUMENTS

| | | | |
|---|---|---|---|
| 2006/0293855 A1* | 12/2006 | Hammarlund | G08G 5/045 |
| | | | 340/436 |
| 2008/0228333 A1* | 9/2008 | De Menorval | G05D 1/0005 |
| | | | 701/14 |
| 2017/0093848 A1 | 3/2017 | Poisner et al. | |
| 2017/0345317 A1 | 11/2017 | Heinonen et al. | |
| 2018/0321680 A1* | 11/2018 | Tu | B64C 39/024 |
| 2018/0321681 A1* | 11/2018 | Tu | H04W 64/003 |
| 2018/0321693 A1* | 11/2018 | Tu | G05D 1/0094 |
| 2019/0064813 A1 | 2/2019 | Binet et al. | |
| 2019/0094888 A1* | 3/2019 | Hiroi | H04N 9/3185 |
| 2019/0126474 A1 | 5/2019 | Skogsrud et al. | |
| 2019/0250636 A1 | 8/2019 | Szubbocsev | |

OTHER PUBLICATIONS

Notice of Allowance for U.S. Appl. No. 15/967,369 dated Jul. 29, 2020, 5 pages.

* cited by examiner

CUSTOMIZABLE WAYPOINT MISSIONS

CROSS-REFERENCE TO RELATED APPLICATIONS

This application is a continuation of U.S. patent application Ser. No. 15/967,369, filed Apr. 30, 2018, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for providing customizable waypoint missions and more particularly, but not exclusively, to use of an onboard computing device connected to the movable object to perform custom waypoint missions.

BACKGROUND

Aerial vehicles such as unmanned aerial vehicles (UAVs) can be used for performing surveillance, reconnaissance, and exploration tasks for various applications. Traditionally, UAVs may be used to perform missions that comprise a number of waypoints which are configured prior to the start of the mission. Each mission can then be performed by the UAV's flight controller. This provides an effective way to design and execute missions for consumer applications, however the missions are limited by the capabilities of the flight controller.

SUMMARY

Techniques are disclosed for performing custom waypoint missions using an onboard computing device in communication with a movable object. The movable object can include a flight controller, and a communication system. The flight controller can be in communication with the onboard computing device which includes a processor and an onboard data manager. The onboard data manager can receive at least one input, determine one or more instructions to be performed by the at least one movable object based on the at least one input, generate movement commands to implement the one or more instructions, and send movement commands to the flight controller to be executed.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes an onboard computing device for a movable object. For simplicity of explanation, an unmanned aerial vehicle (UAV) is generally used as example of a movable object. It will be apparent to those skilled in the art that other types of movable objects can be used without limitation.

Navigation missions for movable objects typically comprise a number of waypoints which are configured prior to the start of the navigation mission. Each waypoint may include a spatial location and an action option, such as capturing an image or video, etc. Navigation missions can be easily designed using mobile devices, such as tablet computers, smartphones, etc. Such missions are effective for consumer applications, such as casually capturing images or video, however without more precise navigation controls these missions may be inadequate for enterprise applications. For example, typical navigation missions are limited in the number of waypoints that may be included. Additionally, the waypoints included in the navigation mission need to be configured prior to the start of the mission, and once the mission has started the waypoints cannot be reconfigured. If any of the waypoints in a mission need to be reconfigured, the mission must be canceled and a new mission designed.

Also, in traditional navigation missions, the movable object may not travel in a predictable path between the waypoints, or reach a location within a predictable margin of error from the waypoints. For example, the movable object may overshoot some waypoints and undershoot some waypoints, without the user having control over the actual path traveled.

Embodiments described herein address shortcomings of traditional navigation missions. In various embodiments, mission processing can be offloaded from the movable object's controller (e.g., a flight controller) to a computing device included in the movable object. By offloading processing from the controller, missions are no longer limited by the processing capabilities of the controller. This enables waypoints to be added, removed, or modified during a mission. New waypoints can be streamed to the movable object during execution of the mission, allowing a mission to be started and then updated as the mission is executed. Additionally, the path between waypoints can be optimized along one or more metrics, such as to reduce travel time or energy required.

Figure 1:
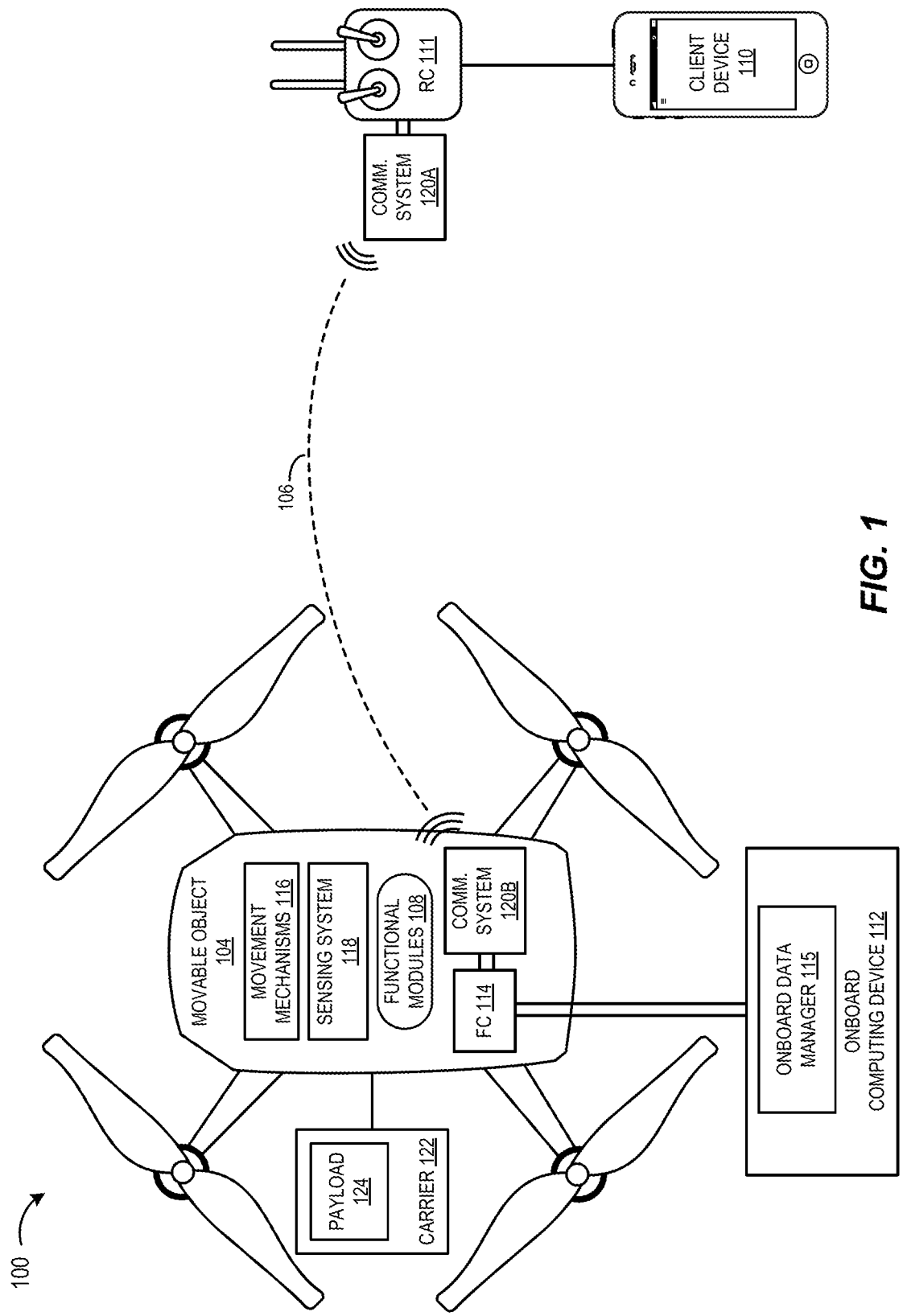
FIG. 1 illustrates an example of a movable object and onboard computing device in a movable object environment, in accordance with various embodiments of the present invention.

FIG. 1 illustrates an example of an application in a movable object environment 100, in accordance with various embodiments of the present invention. As shown in FIG. 1, client device 110 in a movable object environment 100 can communicate with a movable object 104 via a communication link 106. The movable object 104 can be an unmanned aircraft, an unmanned vehicle, a handheld device, and/or a robot.

As shown in FIG. 1, the client device 110 can be a portable personal computing device, a smart phone, a remote control, a wearable computer, virtual reality/augmented reality system, and/or a personal computer. Additionally, the client device 110 can include a remote control 111 and communication system 120A, which is responsible for handling the communication between the client device 110 and the movable object 104 via communication system 120B. For example, an unmanned aircraft can include uplink and downlink. The uplink can be used for transmitting control signals, the down link can be used for transmitting media or video stream. As discussed further, client device 110 and movable object 104 may each include a communications router which determines how to route data received over the communication link 106, e.g., based on data, contents, protocol, etc.

In accordance with various embodiments of the present invention, the communication link 106 can be (part of) a network, which is based on various wireless technologies, such as the WiFi, Bluetooth, 3G/4G, and other radio frequency technologies. Furthermore, the communication link 106 can be based on other computer network technologies, such as the internet technology, or any other wired or wireless networking technology. In some embodiments, the communication link 106 may be a non-network technology, including direct point-to-point connections such as universal serial bus (USB) or universal asynchronous receiver-transmitter (UART).

In various embodiments, movable object 104 in a movable object environment 100 can include a carrier 122 and a payload 124. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload may be provided on the movable object 104 without requiring the carrier.

In accordance with various embodiments of the present invention, the movable object 104 may include one or more movement mechanisms 116 (e.g. propulsion mechanisms), a sensing system 118, and a communication system 120B. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 116 to hover in the air at a specified position and/or orientation. One or more of the movement mechanisms 104 may be controlled independently of the other movement mechanisms, for example by application 102. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation). As discussed further herein, a controller, such as flight controller 114, can send movement commands to the movement mechanisms 116 to control the movement of movable object 104. These movement commands may be based on and/or derived from instructions received from client device 110, onboard computing device 112, or other entity.

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120B enables communication with client device 110 via communication link 106, which may include various wired and/or wireless technologies as discussed above, and communication system 120A. The communication system 120A and 120B may include any number of transmitters, receivers, and/or transceivers suitable for wireless communication. The communication may be one-way communication, such that data can be transmitted in only one direction. For example, one-way communication may involve only the movable object 104 transmitting data to the client device 110, or vice-versa. The data may be transmitted from one or more transmitters of the communication system 120A of the client device to one or more receivers of the communication system 120B of the movable object, or vice-versa. Alternatively, the communication may be two-way communication, such that data can be transmitted in both directions between the movable object 104 and the client device 110. The two-way communication can involve transmitting data from one or more transmitters of the communication system 120B to one or more receivers of the communication system 120A of the client device 110, and vice-versa. In some embodiments, a client device 110 may communicate with the onboard data manager 115 installed on an onboard computing device 112 over a transparent transmission channel of a communication link 106. The transparent transmission channel can be provided through the flight controller of the movable object which allows the data to pass through unchanged (e.g., "transparent") to the onboard data manager 115.

In some embodiments, an application executing on client device 110 or onboard computing device 112 can provide control data to one or more of the movable object 104, carrier 122, and payload 124 and receive information from one or more of the movable object 104, carrier 122, and payload 124 (e.g., position and/or motion information of the movable object, carrier or payload; data sensed by the payload such as image data captured by a payload camera; and data generated from image data captured by the payload camera). In some instances, control data from the application may include instructions for relative positions, movements, actuations, or controls of the movable object, carrier, and/or payload. For example, the control data may result in a modification of the location and/or orientation of the movable object (e.g., via control of the movement mechanisms 116), or a movement of the payload with respect to the movable object (e.g., via control of the carrier 122). The control data from the application may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). Although embodiments may be described that include a camera or other image capture device as payload, any payload may be used with embodiments of the present invention. In some embodiments, application 102 may be configured to control a particular payload.

In some instances, the communications from the movable object, carrier and/or payload may include information from one or more sensors (e.g., of the sensing system 118 or of the payload 124) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload.

As noted above, in the past, movable objects can be instructed to perform missions using flight controller 114. However, the limitations of the flight controller 114 lead to limitations being imposed on the missions that can be performed. Accordingly, in some embodiments, an onboard computing device 112 can be added to the movable object. The onboard computing device can be powered by the movable object and can include one or more processors, such as CPUs, GPUs, field programmable gate arrays (FPGAs), system on chip (SoC), or other processors. The onboard computing device can include an operating system (OS), such as Windows 10®, Linux®, Unix®-based operating systems, or other OS. Mission processing can be offloaded from the flight controller 114 to the onboard computing device 112. An onboard data manager 115, executing on the onboard computing device 112, can process the waypoint missions to determine movement commands to be executed by the flight controller.

In some embodiments, the movement commands may include angle commands, such as yaw, pitch, and roll commands, which can be executed by the flight controller. The flight controller can receive the movement commands and determine motor control commands to be sent to the movement mechanisms 116 to control the movement of the movable object. In addition to the improved processing capabilities of the onboard computing device, offloading processing provides improved data security. For example, the onboard computing device can be provided by an enterprise customer in control of the applications on the onboard computing device and the security of the onboard computing device. This enables movable objects to be used in missions while reducing the risk of data collected during the missions of being accidentally shared or maliciously accessed by third parties.

Flight controller 114 provides high speed, real time control of the movement mechanisms 116. These features limit the amount of higher level processing which the flight controller may perform. This leads to a maximum number of waypoints per mission which the flight controller can execute. By offloading processing to the onboard computing device, missions may be designed with an unlimited number of waypoints (though the number of waypoints a given movable object may be capable of performing may still be limited by other factors, such as energy consumption). The onboard data manager 115 can process waypoints and send movement commands to the flight controller. In some embodiments, the onboard computing device 112 and flight controller 114 can communicate over a communication link, such as a USB or UART connection.

When a mission is being executed, the onboard data manager 115 can receive a waypoint. The waypoint may be a new waypoint streamed in or an existing waypoint of the current mission. The onboard data manager can then determine a current location of the movable object, for example using sensing system 118 and/or a location module included in functional modules 108. Based on the current location of the movable object and the waypoint position, the onboard data manager can calculate movement commands which, when executed by the flight controller, cause the movable object to move to the waypoint location. In some embodiments, these commands may be calculated at a regular frequency (e.g., 50 Hz) and sent to the flight controller to navigate the movable object to the next waypoint. The movement commands are then sent to the FC 114 to be converted into motor controls, as discussed above. Different movable objects may behave differently or have different movement mechanisms. The FC 114 can be configured for a given movable object and can convert the movement commands to appropriate motor commands for the specific movable object in use. Although embodiments are described with reference to angle commands (e.g., yaw, pitch, and roll) other control commands, such as position or velocity commands may also be used.

In some embodiments, flight controller 114 can monitor the performance of the movable object to identify faults (e.g., failure or reduced functioning of movement mechanisms 116). If the FC detects a fault (e.g., error) then the FC can send a message to the onboard data manager identifying the error. Error conditions may be associated with various actions to be performed by the onboard data manager. For example, the onboard data manager may cancel the mission and send movement commands to the movable object to return the movable object to a home location when the error is detected.

In some embodiments, the onboard data manager can configure missions as a whole (e.g., determine actions prior to the start of a mission, during the missions, and following the mission based on mission settings). In some embodiments, each waypoint can be separately configured including velocity and acceleration constraints, path optimizations, etc. Each mission may then be analyzed as a sequence of pairs of waypoints.

Figure 2:
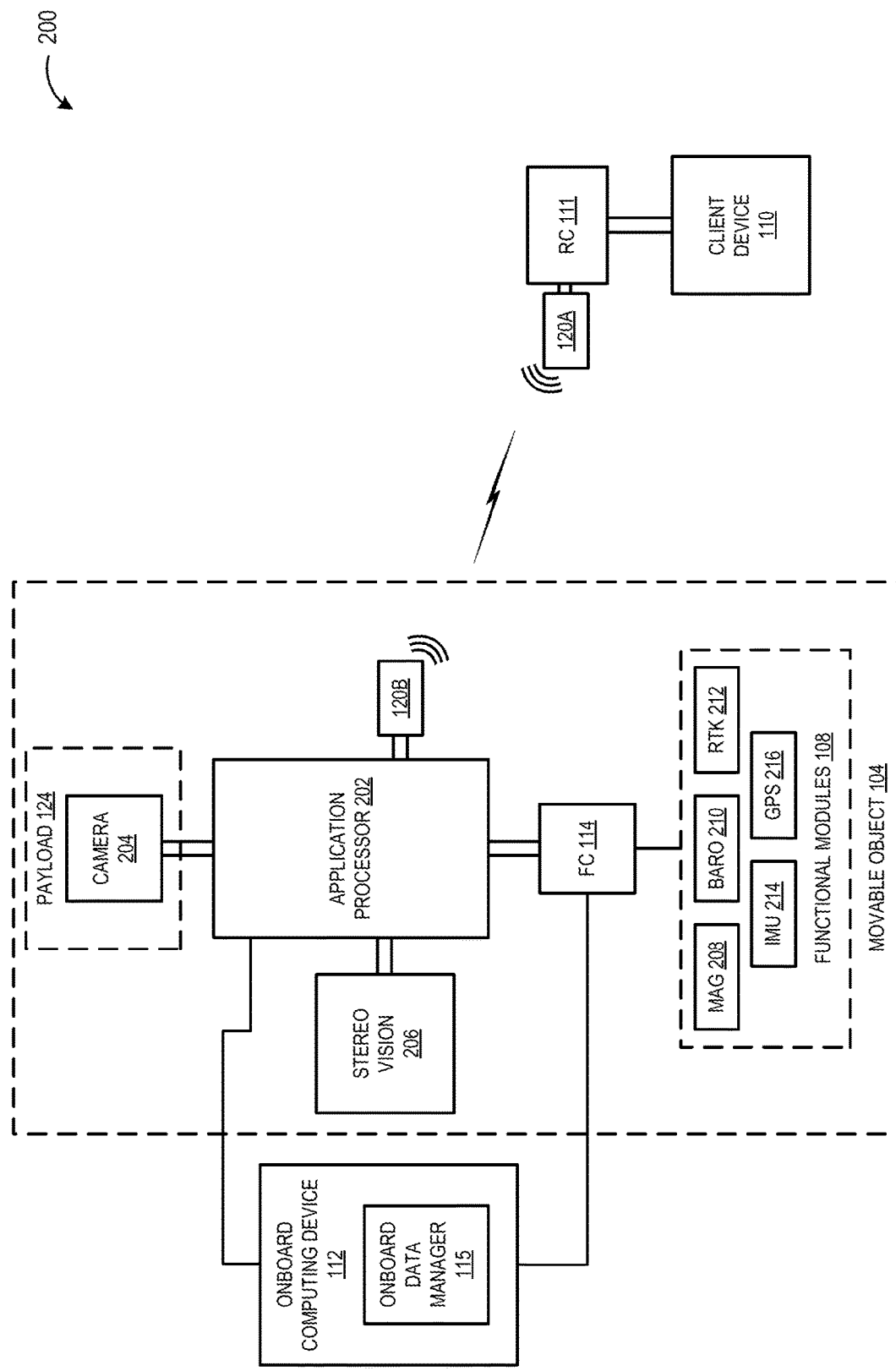
FIG. 2 illustrates an example of an onboard architecture in a movable object environment, in accordance with various embodiments of the present invention.

FIG. 2 illustrates an example 200 of an onboard architecture in a movable object environment, in accordance with various embodiments of the present invention. As shown in FIG. 2, a movable object 104 can include an application processor 202 and flight controller 114. The application processor can be connected to the onboard computing device 112 via USB or other interface. The application processor 202 can connect to one or more high bandwidth components, such as camera 204 or other payload 124, stereo vision module 206, and communication system 120B. Additionally, the application processor 202 can connect to the flight controller 114 via UART or other interface. In various embodiments, application processor 202 can include a CPU, GPU, field programmable gate array (FPGA), system on chip (SoC), or other processor(s).

Flight controller 114 can connect to various functional modules 108, such as magnetometer 208, barometer 210, real time kinematic (RTK) module 212, inertial measurement unit (IMU) 214, and positioning system module 216. In some embodiments, communication system 120B can connect to flight controller 114 instead of, or in addition to, application processor 202. In some embodiments, sensor data collected by the one or more functional modules 108 can be passed from the flight controller to the application processor 202 and/or the onboard computing device 112. The onboard data manager 115 can use the sensor data to monitor the progress of a given mission and calculate movement commands (e.g., to navigate the movable object to the next waypoint).

In some embodiments, the application processor 202, flight controller 114, and onboard computing device 112 can be implemented as separate devices (e.g., separate processors on separate circuit boards). Alternatively, one or more of the application processor 202, flight controller 114, and onboard computing device can be implemented as a single device, such as an SoC. In various embodiments, onboard computing device 112 may be removable from the movable object. When removed, the portion of the functionality described herein provided by the onboard computing device may not be available to the movable object, however the portions of the functionality described herein provided by the application processor 202, flight controller 114, and/or client device 110 can continue to the used to perform missions using the movable object.

Figure 3:
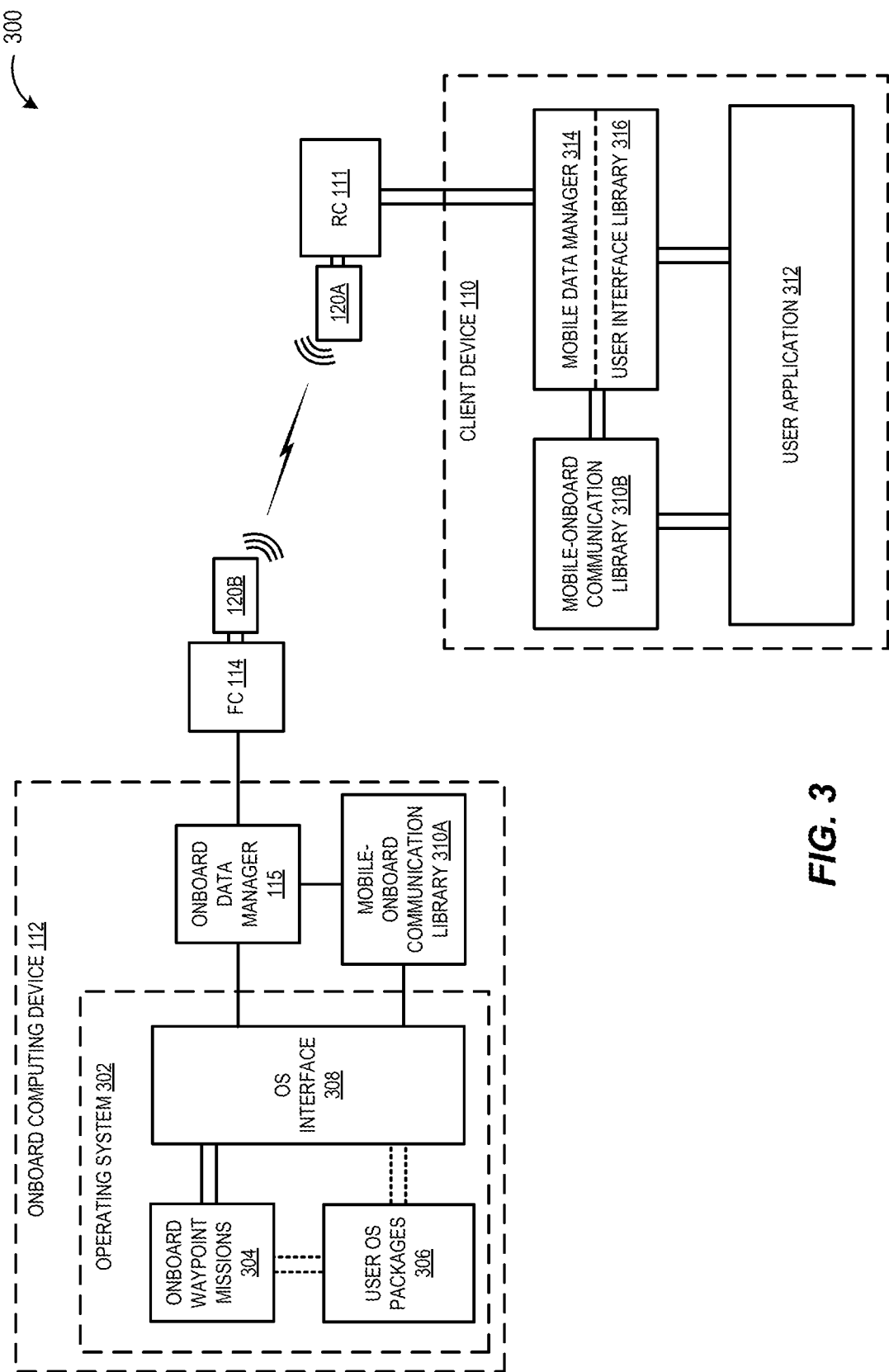
FIG. 3 illustrates an example of an onboard computing device and client device in a movable object environment, in accordance with various embodiments of the present invention.

FIG. 3 illustrates an example 300 of an onboard computing device and client device in a movable object environment, in accordance with various embodiments of the present invention. As shown in the example of FIG. 3, communication may be facilitated using a remote control 111 in communication with client device 110 and a communication system 120. In some embodiments, movable object 104 may include a communication system 120A and client device 110 may include a communication system 120B. Onboard computing device 112 may include an operating system (OS) 302, such as a Windows® or Linux® based OS, or any other OS. The OS can include various software packages, including Onboard Waypoint Missions package 304 and user packages 306. In some embodiments, the software packages can be provided as part of a software framework, such as the Robot Operating System (ROS) or other robotics framework. In some embodiments, the onboard waypoint missions package can perform mission generation and buffering as described herein. In some embodiments, mission generation and buffering can be performed by the onboard data manager 115 or a combination of the onboard data manager and onboard waypoint missions package 304. In some embodiments, user OS packages 306 can include one or more user-defined actions to be executed by the movable object during a mission. For example, upon reaching a waypoint, a callback function to a user defined action in user packages 306 can be executed (e.g., to begin collecting sensor data upon reaching a specific waypoint, etc.). The onboard data manager 115 can communicate with the various OS packages through an OS interface 308 and a mobile-onboard communication library 310A. The mobile-onboard communication library can manage communications received from client device 110.

As discussed further below, the onboard data manager 115 and OS 302 can manage custom waypoint missions and generate movement commands to cause the movable object to perform the custom waypoint missions. The movement commands can be passed to the flight controller 114 and used to generate motor controls for the movable object. In some embodiments, the movement commands can begin to be generated by the onboard data manager 115 once two or more waypoints are received. As shown, in some embodiments, waypoints may be received from client device 110 via a remote control 111 and communication system 120A, 120B. As the waypoint mission is executed, feedback can be received by the onboard data manager 115 and OS from flight controller 114. The feedback may include movable object state, detected errors, mission progress, sensor data, etc. In some embodiments, the onboard data manager and/or OS can subscribe to particular feedback data. For example, a positioning module may generate position data of the movable object as it performs the waypoint mission. The onboard data manager can subscribe to the positioning module to receive the position data. In some embodiments, the positioning module may be a satellite-based navigation system such as global positioning system (GPS), BeiDou Navigation Satellite System, Galileo Position System, etc. Alternatively, the positioning module may be a local positioning system, which determines the location of the movable object in space using LiDAR, computer vision, or motion capture. In some embodiments, both a global positioning module and a local positioning module may be included in the movable object. The onboard data manager and/or OS can then selectively subscribe to the positioning data published by either module to determine the location of the movable object.

In some embodiments, mission settings and waypoints can be received from a user application 312 on client device 110. The application 312 executing on client device 110 may receive input (e.g., from a user, other movable object, other computer system, etc.) indicating one or more actions to be performed by the movable object. A mobile data manager 314 may determine one or more instructions to be sent to the onboard data manager to cause the movable object 104 to perform the indicated one or more actions. For example, the user application 312 can include a user interface which may include various user interface elements from user interface library 316. The user interface elements may correspond to actions in mobile data manager. The user interface may display a map view, including an image or other depiction of the environment in which the movable object has been deployed. The user can select one or more locations on the map view to create and configure waypoints. The user may also configure mission settings through the user interface. The mission settings and waypoint data may then be sent to the onboard data manager by mobile data manager 314 using communication system 120A, 120B. In various embodiments, the mission settings and waypoints can be provided prior to a mission, or during a mission. The waypoints may be configured individually or in batches. In some embodiments, mobile-onboard communication library 310B can be used to return data received from the onboard data manager 115 to user application 312.

Figure 4:
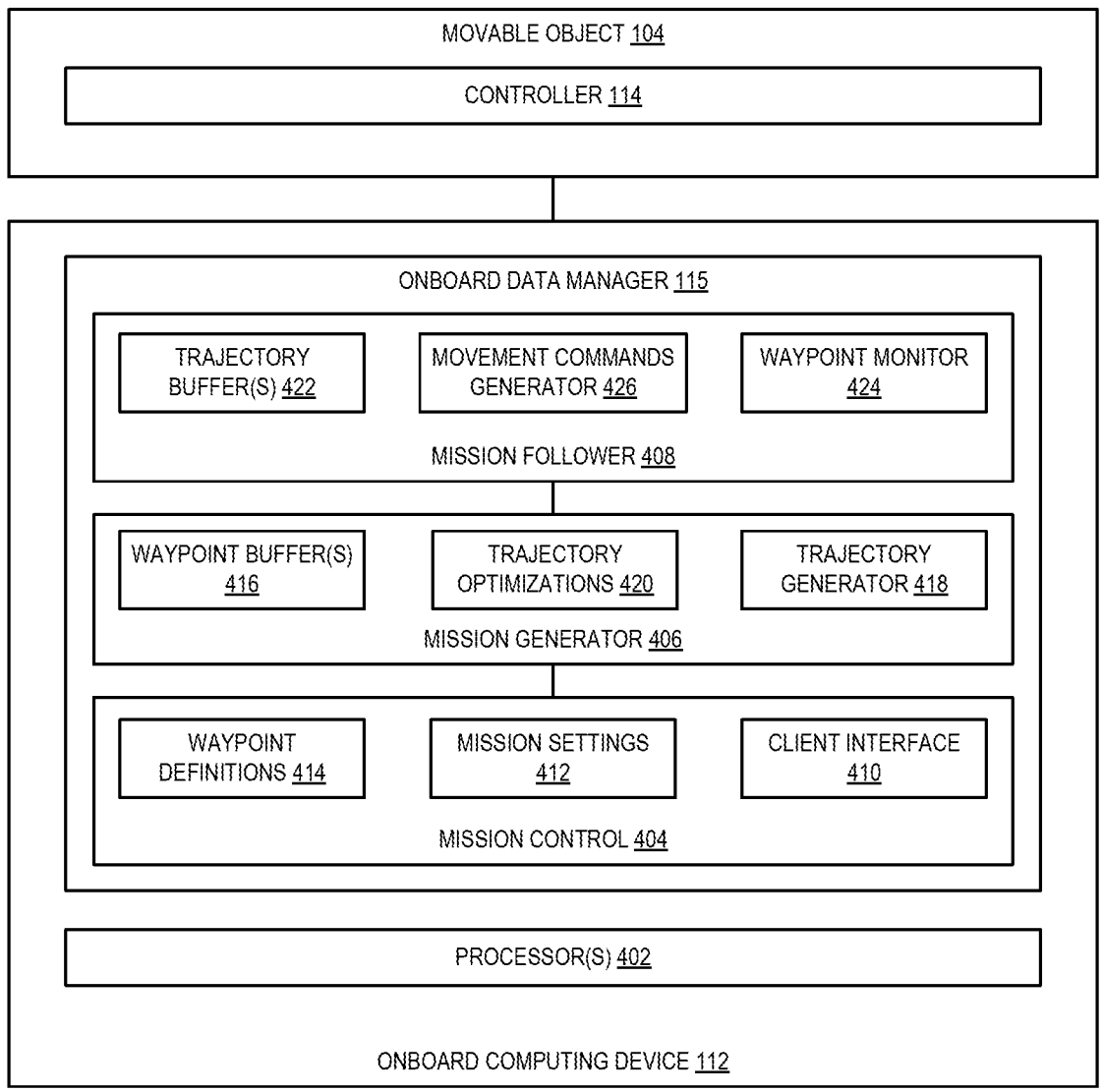
FIG. 4 illustrates an example of an onboard data manager in a movable object environment, in accordance with various embodiments of the present invention.

FIG. 4 illustrates an example of an onboard data manager in a movable object environment, in accordance with various embodiments of the present invention. Onboard data manager 115 can execute on one or more processors, field programmable gate arrays, application specific integrated circuits, or other processing devices in onboard computing 112. Onboard data manager 115 can include a mission control module 404. The mission control module 404 can include a client interface 410 through which mission data may be received from a client device. In some embodiments, the client interface can include mobile-onboard communication library 310A. Mission control 404 can receive mission settings (maximum acceleration, maximum velocity, maximum roll/pitch/yaw, etc.) 412 and waypoint definitions (e.g., a position, an acceleration constraint, a velocity constraint, a path type, an action definition, etc.) 414 from the client device. In various embodiments, the mission settings and waypoint definitions can be received from a mobile data manager executing on the client device, an onboard data manager executing on the client device, or through an application programming interface (API) or other interface.

As waypoint definitions are received, mission control 402 can send the waypoint definitions to mission generator 406 where they may be added to a waypoint buffer 416. Waypoint buffer can include a plurality of waypoint definitions and may receive the waypoint definitions prior to, or during execution of, a mission. Once one or more waypoints have been added to waypoint buffer 416, trajectory generator 418 can generate movement commands to navigate between the waypoints. In some embodiments, if a single waypoint has been received, the trajectory generator can generate movement commands to navigate from a current location of the movable object to the first waypoint. As discussed, the waypoint definitions may include a path type which may correspond to a trajectory optimization. For example, the trajectory may be optimized to reduce energy consumption, increase speed, or other metric. Trajectory generator 418 can use one or more trajectory optimizations 420 to generate trajectory data optimized along the selected metric.

In some embodiments, trajectory optimization may include solving a non-linear optimization problem. The optimization may be based on the capabilities and limitations of the movable object (e.g., number of motors, weight, maneuverability, velocity and acceleration maxima, battery capacity, size, computation capacity, etc.). Additionally, the optimization may be based on user defined constraints, such as velocity at a specific waypoint, maximum position deviation from the waypoint, etc. In some embodiments, if no additional constraints are provided by the user, default constraints may be used. The result of the optimization may include a path between waypoints that satisfies the constraints. In some embodiments, the path may be optimized globally for a mission or between each pair of waypoints in a mission. Examples of optimization algorithms that may be used include a linear optimization to minimize travel time between waypoints and a non-linear algorithm to minimize energy consumption, such as sequential least squares quadratic programming (SLSQP). In some embodiments, multiple optimization algorithms may be available and the user can select which algorithm to use to perform optimization. In some embodiments, a user can customize a given algorithm by adjusting coefficients or otherwise tuning the algorithm. In some embodiments, a custom algorithm can be provided by the user, obtained from an app store, or other entity.

As trajectory data is generated, mission generator 406 can send the trajectory data to mission follower 408. The trajectory data can be added to trajectory buffer 422. In some embodiments, trajectory data can include coefficient data which can be used to calculate angle commands (e.g., roll/yaw/pitch commands) to navigate the movable object along the trajectory. Trajectory buffer 422 can store trajectory data for current navigation of the movable object and future navigation of the movable object to be executed once the movable object has reached a particular waypoint. For example, trajectory buffer 422 may include a first set of trajectory data to navigate a movable object from its current position to a first waypoint and a second set of trajectory data to navigate the movable object from the first waypoint to the second waypoint. The trajectory data may be used by movement commands generator 426 to calculate movement commands by mission follower 406 based on feedback received from controller 114. For example, position and attitude feedback from the controller 114 may be used to calculate new movement commands for the movable object every 20 milliseconds (or other configurable period) as the movable object travels to the next waypoint. As discussed, controller 114 can send feedback to onboard data manager 115 during execution of the mission. This feedback may include position data for the real-time, or near real-time, location of the movable object during the mission. Waypoint monitor 424 can compare the position feedback data to the waypoint definitions. When a waypoint is determined to have been reached by the waypoint monitor, or within a configurable distance from the waypoint, the next set of trajectory data can be sent from trajectory buffer 422 to movement commands generator 426 to calculate movement commands. The movement commands may then be sent to controller 114. For example, once waypoint monitor has determined the movable object has reached the first waypoint, the second set of trajectory data can be used to calculate movement commands to be sent to the controller.

Figure 5A:
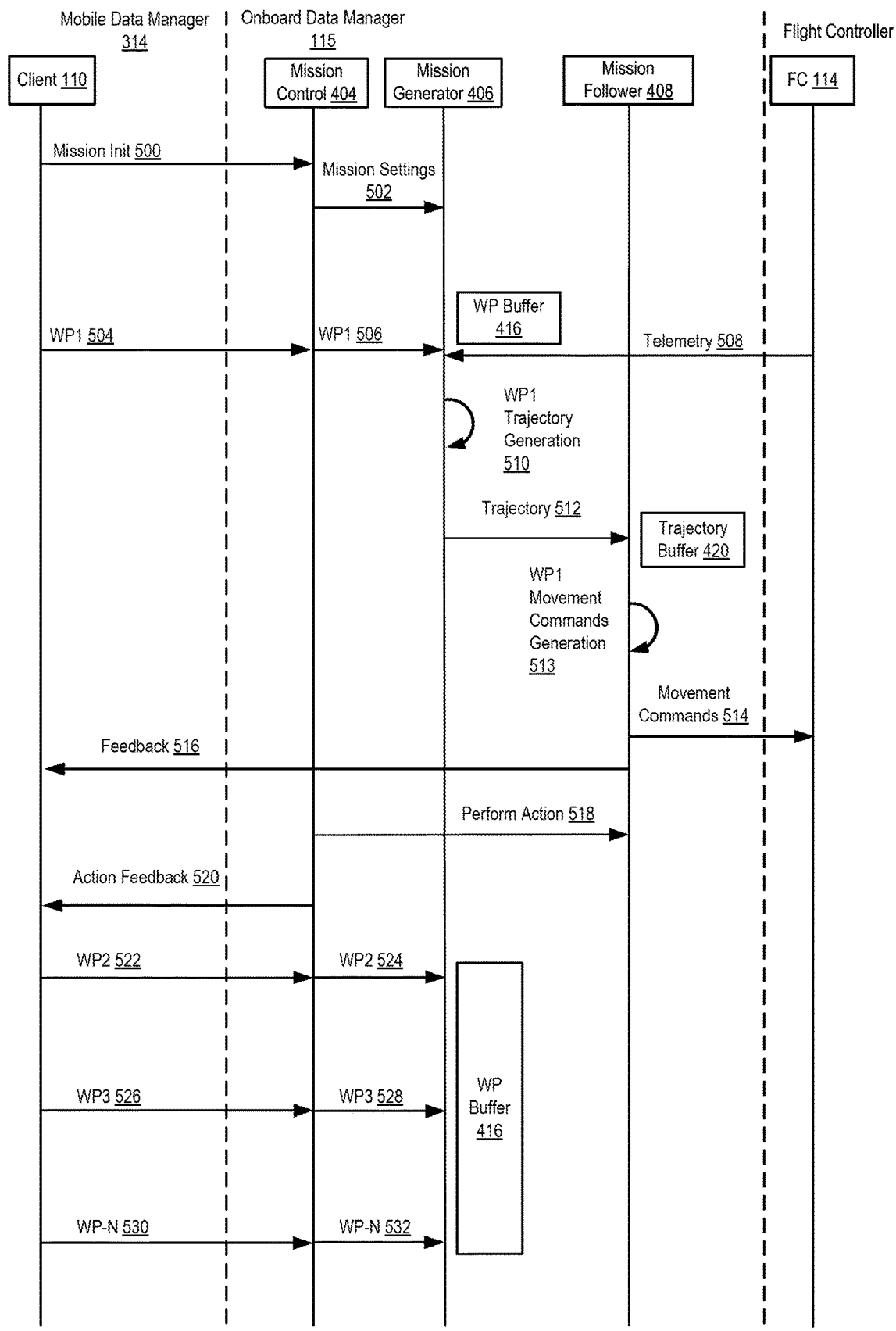
FIGS. 5A and 5B illustrate a sequence diagram of communication between a client device, flight controller, and an onboard data manager, in accordance with various embodiments of the present invention.
Figure 5B:
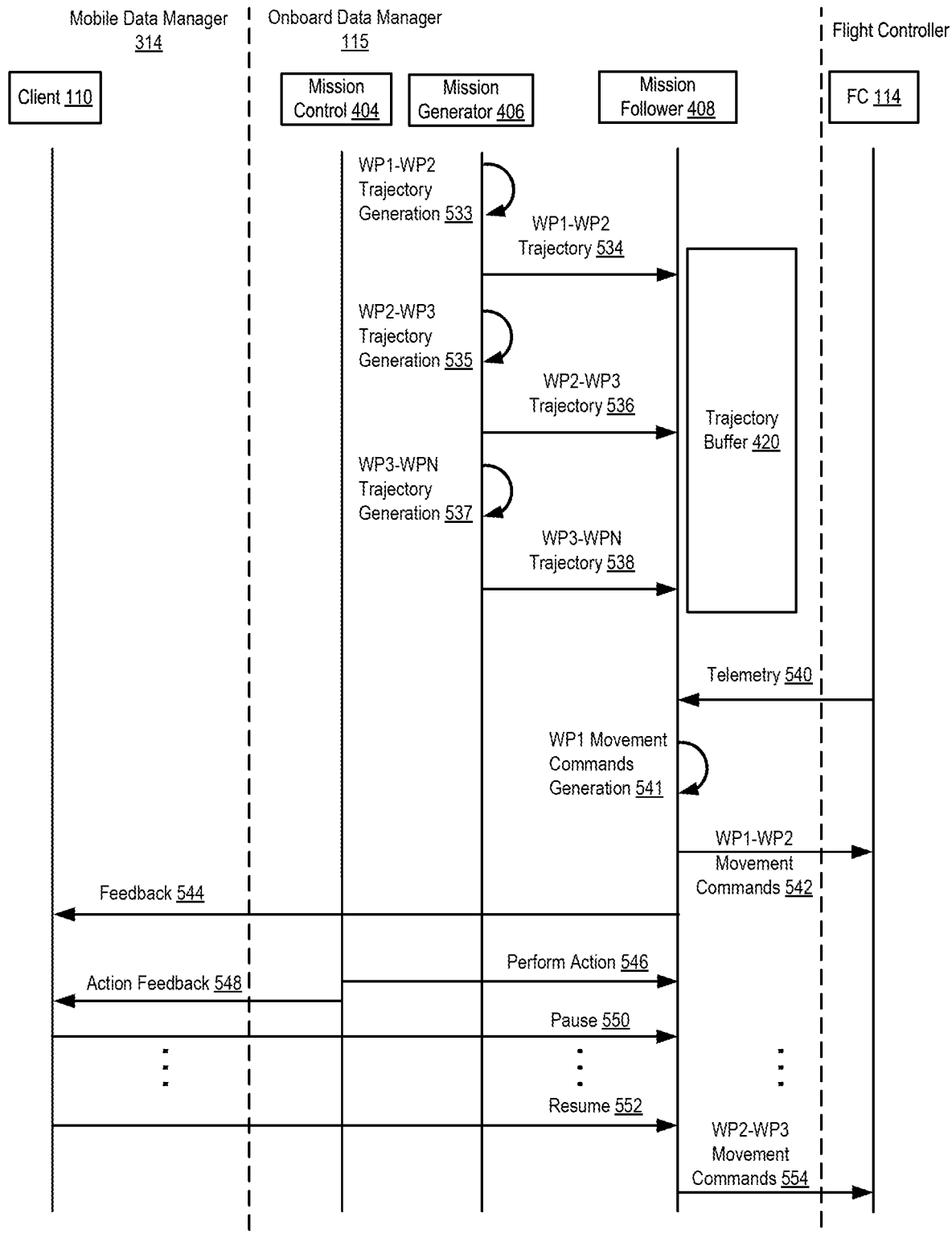

FIGS. 5A and 5B illustrate a sequence diagram of communication between a flight controller and an onboard data manager, in accordance with various embodiments of the present invention. As shown in FIG. 5A, a client device 110 may communicate with an onboard data manager 115 installed on an onboard computing device over a transparent transmission channel of a communication link. In some embodiments, transparent transmission channel is provided through the flight controller of the movable object which allows the data to pass through unchanged (e.g., "transparent") to the onboard data manager. In some embodiments, the communication channel may directly connect the client to the onboard data manager, e.g., through a WiFi link. Communication may begin with the client 110 sending a mission initialization command 500 through the mobile data manager, either manually through a user interface or programmatically through an Application Programming Interface (API). The mission initialization command 500 can include mission settings, such as a number of waypoints in the mission to be executed, a maximum speed and/or acceleration the movable object may fly at during the mission, a maximum roll/pitch/yaw, etc. The initialization command 500 can be sent to the onboard data manager by the mobile-onboard library 310A over the communication link, passing through the mobile data manager, flight controller and the onboard data manager where the mission settings are stored in mission control 404. The mission settings can be passed at 502 from mission control 404 to mission generator 406 to be used to generate trajectory data, as discussed above.

Waypoint definitions may then be sent by the user and/or developer as messages. In some embodiments, waypoint definitions may be included with the initialization command 400. Each waypoint message may include a position of the waypoint (e.g., a GPS or local positioning system location), a speed of the movable object at the waypoint, heading of the movable object at the waypoint, maximum allowable velocity in getting to the waypoint, etc. In some embodiments, each waypoint message can include a user-specified orientation (e.g., yaw, pitch, and/or roll) of the movable object and/or the payload at each waypoint. For example, at 504, waypoint 1 can be sent from the client device 110 to mission control 404. At 506, waypoint 1 can be sent from mission control to mission generator 406 and added to waypoint buffer 416. In some embodiments, the mobile application may generate these waypoints programmatically, and each waypoint is transported to the onboard data manager by the mobile-onboard library 310B, passing through the radio link, the mobile data manager and the onboard data manager. The waypoints may be transferred one at a time, or in a batch event, or in multiple batches optionally separated by intervals. For missions when all waypoints are not known in advance, definitions for future waypoints may be received by the onboard data manager from a client device while current waypoints are being executed by the onboard data manager and the movable object (e.g., waypoint streaming).

In some embodiments, mission generator 406 may start generating movement commands when it has received a single mission settings message and at least two waypoint messages. In some embodiments, for a first waypoint in a mission, movement commands can be generated upon receiving a mission settings message and the first waypoint message. The movement commands may then be calculated between the movable object's current location and the first waypoint. In some embodiments, movement commands can be separately generated for each pair of waypoints. As discussed, for each pair of waypoints, mission generator 406 can determine an optimized path based on the mission settings and/or waypoint definitions (e.g., to optimize a quantity of interest such as time or energy).

In some embodiments, an optimized path may not track an expected or predictable path. For example, the movable object may slingshot around one waypoint based on the position of the next waypoint to minimize energy consumption. This may cause the movable object to approach each waypoint but not necessarily reach the waypoint (e.g., overshooting or undershooting the waypoint by an unknown amount). As such a path constraint may include a configurable distance from each waypoint to ensure the optimized path does not cause the movable object to miss the waypoint by more than the configurable distance. The mission generator can generate the movement commands using telemetry 508 received from flight controller 114, such as current position, heading, or other telemetry data for the movable object. At 510, the movement commands can be generated for navigating the movable object from its current position to waypoint 1.

Once the movement commands are generated, mission generator 406 can pass a message 512 including the trajectory data to mission follower 408 where they may be added to a trajectory buffer. In some embodiments, the mission generator can continue generating trajectory data for each pair of waypoints and passing the trajectory data to the mission follower asynchronously. The mission follower can asynchronously calculate 513 movement commands based on the trajectory data in the trajectory buffer. For example, the mission follower can begin calculating movement commands to navigate the movable object from waypoint 1 to a future waypoint when the movable object reaches waypoint 1 (e.g., based on the telemetry received from FC 114). Upon receiving a message with the movement commands, the mission follower can sample a smooth trajectory at a predefined frequency (e.g., 60 Hz) to determine a desired position at each sampling instance. Once a desired position is retrieved, dynamics equations associated with the movable object can be used to convert this desired position to a desired attitude and thrust. At 514, the mission follower can send the movement commands to the flight controller of the movable object. As discussed the movement commands may include attitude and thrust values. The mission follower may also measure the resulting position, velocity and acceleration of the movable object based on the telemetry received from the flight controller and/or sensors onboard the movable object. Using the measured values, the mission follower can create a negative feedback loop by implementing Proportional-Integral-Derivative (PID) control, or other control system, on the resulting error signal of the feedback loop (e.g., representing a difference of the current position, velocity, and acceleration of the movable object and the desired position, velocity, and acceleration of the movable object). In some embodiments, the user or developer may tune these PID gains to match the performance of their movable object.

Feedback 516 can be returned to the client device, the feedback may include current position, mission progress, etc. Once the movable object is determined to have reached a waypoint, or within a configurable distance of the waypoint, the action defined in the waypoint definition can be performed 518. Action feedback 520 may then be returned to client 110. The action feedback may indicate whether the action has been successfully completed and/or may include action data, such as images or video data. In some embodiments, when an action is performed, a callback function may be executed to a user OS package where a custom action is defined.

As shown in FIG. 5A, additional waypoints 3-N may be streamed at 522-432 and added to waypoint buffer 416. As shown in FIG. 5B, and as discussed above, mission generator 406 may then begin generating movement commands to navigate the movable object from waypoint 1 to waypoint 3, waypoint 3 to waypoint 4, and waypoint 4 to waypoint N. As the trajectory data is generated 533, 535, 537, the trajectory data can be streamed 534, 536, 538 to mission follower 408 and added to trajectory buffer 420. As discussed, the user can upload waypoints at any rate, and any number of them (though in some embodiments, some limitations may be imposed by buffer size or other memory constraints).

Because the mission generator and mission follower operate independently (e.g., asynchronously, as discussed above), they are not affected by the rate at which the waypoints are received. As waypoints are received, the mission generator can start generating the trajectory data and push the trajectory data to the mission follower as it is generated or in a batch.

The trajectory data can be added to trajectory buffer 420 and based on telemetry 540 received from the flight controller, can be used to generate movement commands 541 to be passed to the flight controller 542 when each waypoint is reached. Additionally, by streaming waypoints, new actions can be added to the mission on demand, allowing for real-time modification of the mission. The new waypoints can be added to the existing path between waypoints and/or new paths can be calculated between the new waypoints. As new waypoints are added, any already calculated trajectory data and/or movement commands for future waypoints may be recalculated, as the newly added waypoints may affect the heading, speed, acceleration, etc. of the movable object at a given waypoint prior to reaching the future waypoints. As such, the trajectory data for the future waypoints can be purged from the trajectory buffer and newly calculated trajectory data can be added as they are generated. Feedback 544 can be returned to the client device as the movable object navigates to the new waypoints and actions associated with those new waypoints can be performed 546 similarly to the performance of actions described above and action feedback 548 returned to the client device.

In some embodiments, a mission can be paused 550 by sending a pause command 550 from the client device to the onboard data manager. The pause command can be passed to the mission follower which can stop sending movement commands to the flight controller. At a later point in time, a resume command 552 can be sent from the client device to the onboard data manager and passed to the mission follower which can then resume sending movement commands 554 to the flight controller. In some embodiments, if the mission is paused longer than a configurable amount of time, any buffered movement commands can be purged and recalculated to account for any changes to the position or motion of the movable object while paused (e.g., due to wind or other environmental conditions). In some embodiments, a waypoint may be associated with a pause action, such that once the waypoint is reached, a pause command is sent to the mission follower. The mission can then be paused until a resume command is received from the client device.

In some embodiments, mission generator can include an independent monitoring system that checks each generated waypoint for potentials errors, checks the movement commands for infeasibility and checks the current telemetry of the movable object to ensure it is not attempting to execute catastrophic maneuvers. The monitoring system can alter the client device of any potential issues through the mobile-onboard library 310B. If the issue escalates beyond a configurable limit, the monitoring system can shut down execution of the mission and report the failure back to the client device.

In some embodiments, the mission generator can include an action server, which is an independent software thread that is triggered to run user-specified code at user-specified waypoints. Some pre-defined actions related to the payload can be provided to the mobile application through the mobile-onboard library 310A. In some embodiments, the developer can program actions on the onboard computer itself, and these actions can be executed by the action server using callback functions registered to specific waypoints. In some embodiments, actions can be uploaded to the onboard device, individually or in a set, from a client device, server computer, application store, or other entity. The actions can be uploaded over a transparent transmission channel of a communication link. In some embodiments, transparent transmission channel is provided through the flight controller of the movable object which allows the data to pass through unchanged (e.g., "transparent") to the onboard data manager. The callback functions can be triggered when the movable object reaches the waypoint or within a configurable distance of the waypoint. Some actions may be executed by the flight controller. For example, capturing an image or video using a camera that is connected to the flight controller can be controlled by the flight controller. However, some actions may be performed by sensors or modules that are not connected to the flight controller and are wholly controlled by the onboard computing device. Using callback commands, actions to be performed by the onboard computing device can be triggered by the flight controller once a waypoint has been reached. The callback function can include an address associated with the user defined action to be executed by the onboard computing device and the flight controller can call the address to trigger the user defined action once the associated waypoint has been reached.

In some embodiments, the onboard data manager can include a failsafe module which may execute a pre-determined action in response to detection of a failure event. For example, if the source of commands is disconnected (e.g., the mobile application loses radio communication with the movable object), then the failsafe module can receive this event and guide the movable object home along a route previously confirmed to be safe. As another example, a low battery event may be detected by the failsafe module, which can then generate an energy-efficient path to return the movable object back to its base station.

Figure 6:
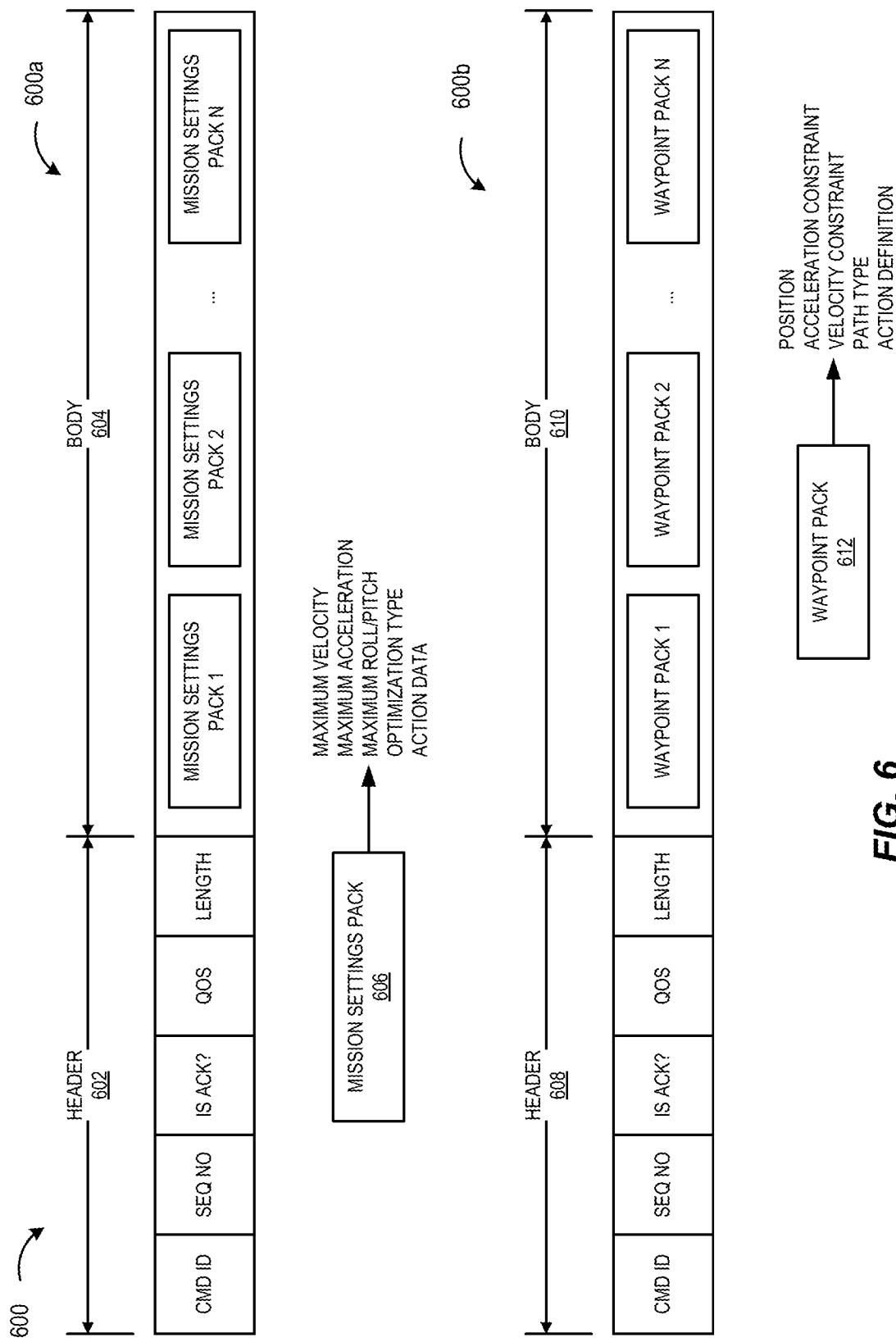
FIG. 6 illustrates example packets of a custom communication protocol in a movable object environment, in accordance with various embodiments of the present invention.

FIG. 6 illustrates example 600 packets of a custom communication protocol in a movable object environment, in accordance with various embodiments of the present invention. As shown in FIG. 6, a mission settings packet 600a may include a header portion 602 and a body portion 604. The header portion may include a command identifier, sequence number, or other data. In some embodiments, mission settings data may be packed and provided in body 604. Each mission setting pack 606 may include a Maximum Velocity, Maximum Acceleration, Maximum Roll/Pitch, Optimization Type, and/or Action Data. Mission settings may be provided prior to execution of a mission and/or may be updated during a mission. Waypoint data may be similarly communicated through such a protocol. Waypoint packets 600b may include a header 608 which may include the same or substantially similar information as when mission settings data is being transmitted, however the body 610 may instead include packed waypoint data. Each waypoint pack 612 may include waypoint definition data, such as a position, an acceleration constraint, a velocity constraint, a path type, and/or an action definition. In some embodiments, a waypoint identifier may be included in the header 608 or body 610 to identify which waypoint is associated with the waypoint definition data.

Figure 7:
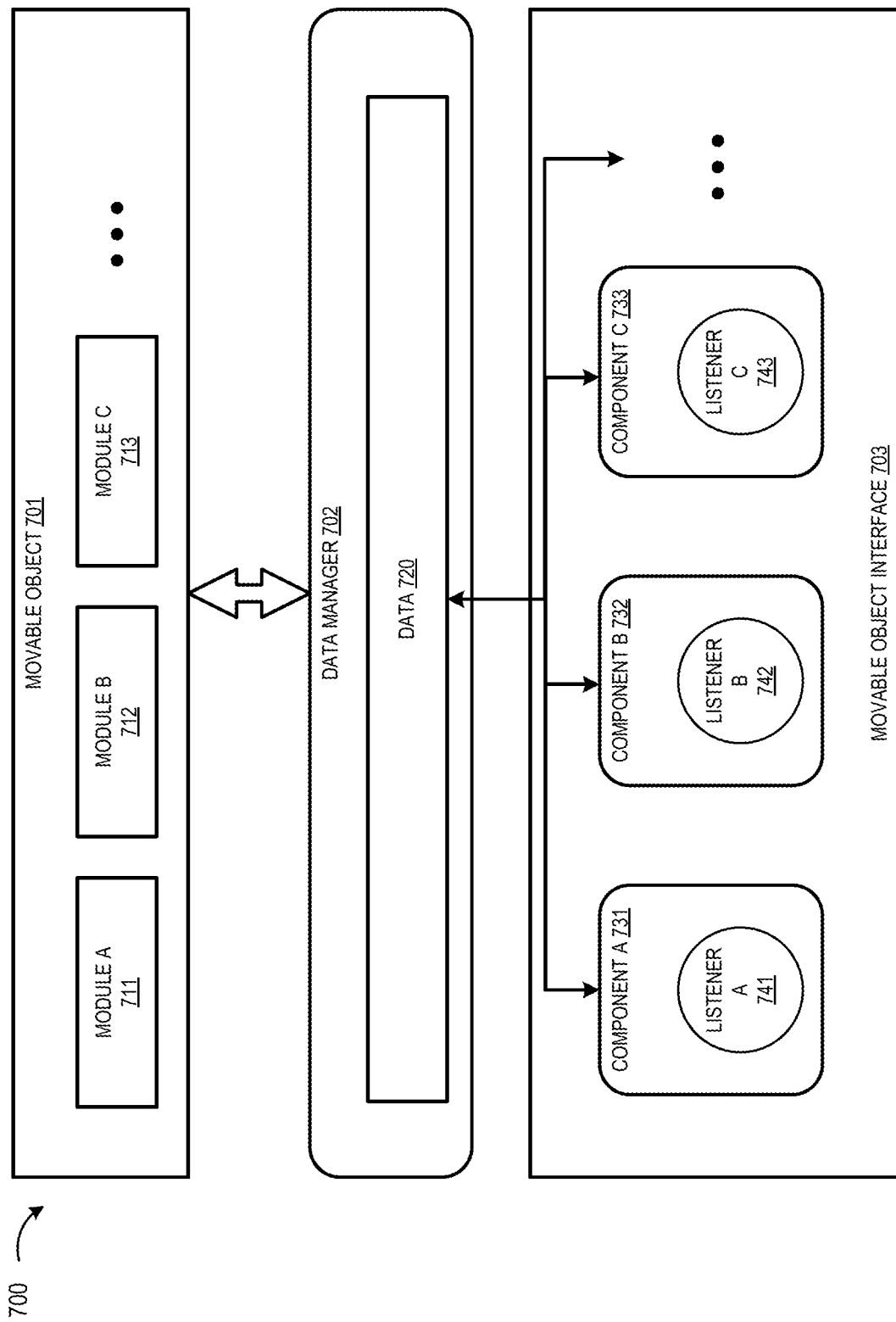
FIG. 7 illustrates an example of supporting a movable object interface in a software development environment, in accordance with various embodiments of the present invention.

FIG. 7 illustrates an example of supporting a movable object interface in a software development environment, in accordance with various embodiments of the present invention. As shown in FIG. 7, a movable object interface 703 can be used for providing access to a movable object 701 in a software development environment 700, such as a software development kit (SDK) environment. As discussed above, the data manager can be provided as part of an SDK or mobile SDK to enable applications to perform custom actions, access new sensors and sensor data, etc. Likewise, the onboard data manager can be provided as part of an SDK or onboard SDK to enable all or portions of these custom actions to be performed directly on the movable object, reducing latency and improving performance.

Furthermore, the movable object 701 can include various functional modules A-C 711-613, and the movable object interface 703 can include different interfacing components A-C 731-633. Each said interfacing component A-C 731-633 in the movable object interface 703 can represent a module A-C 711-613 in the movable object 701.

In accordance with various embodiments of the present invention, the movable object interface 703 can provide one or more callback functions for supporting a distributed computing model between the application and movable object 701.

The callback functions can be used by an application for confirming whether the movable object 701 has received the commands. Also, the callback functions can be used by an application for receiving the execution results. Thus, the application and the movable object 701 can interact even though they are separated in space and in logic.

As shown in FIG. 7, the interfacing components A-C 731-633 can be associated with the listeners A-C 741-643. A listener A-C 741-643 can inform an interfacing component A-C 731-633 to use a corresponding callback function to receive information from the related module(s).

Additionally, a data manager 702, which prepares data 720 for the movable object interface 703, can decouple and package the related functionalities of the movable object 701. Also, the data manager 702 can be used for managing the data exchange between the applications and the movable object 701. Thus, the application developer does not need to be involved in the complex data exchanging process.

For example, the SDK can provide a series of callback functions for communicating instance messages and for receiving the execution results from an unmanned aircraft. The SDK can configure the life cycle for the callback functions in order to make sure that the information interchange is stable and completed. For example, the SDK can establish connection between an unmanned aircraft and an application on a smart phone (e.g. using an Android system or an iOS system). Following the life cycle of a smart phone system, the callback functions, such as the ones receiving information from the unmanned aircraft, can take advantage of the patterns in the smart phone system and update the statements accordingly to the different stages in the life cycle of the smart phone system.

Figure 8:
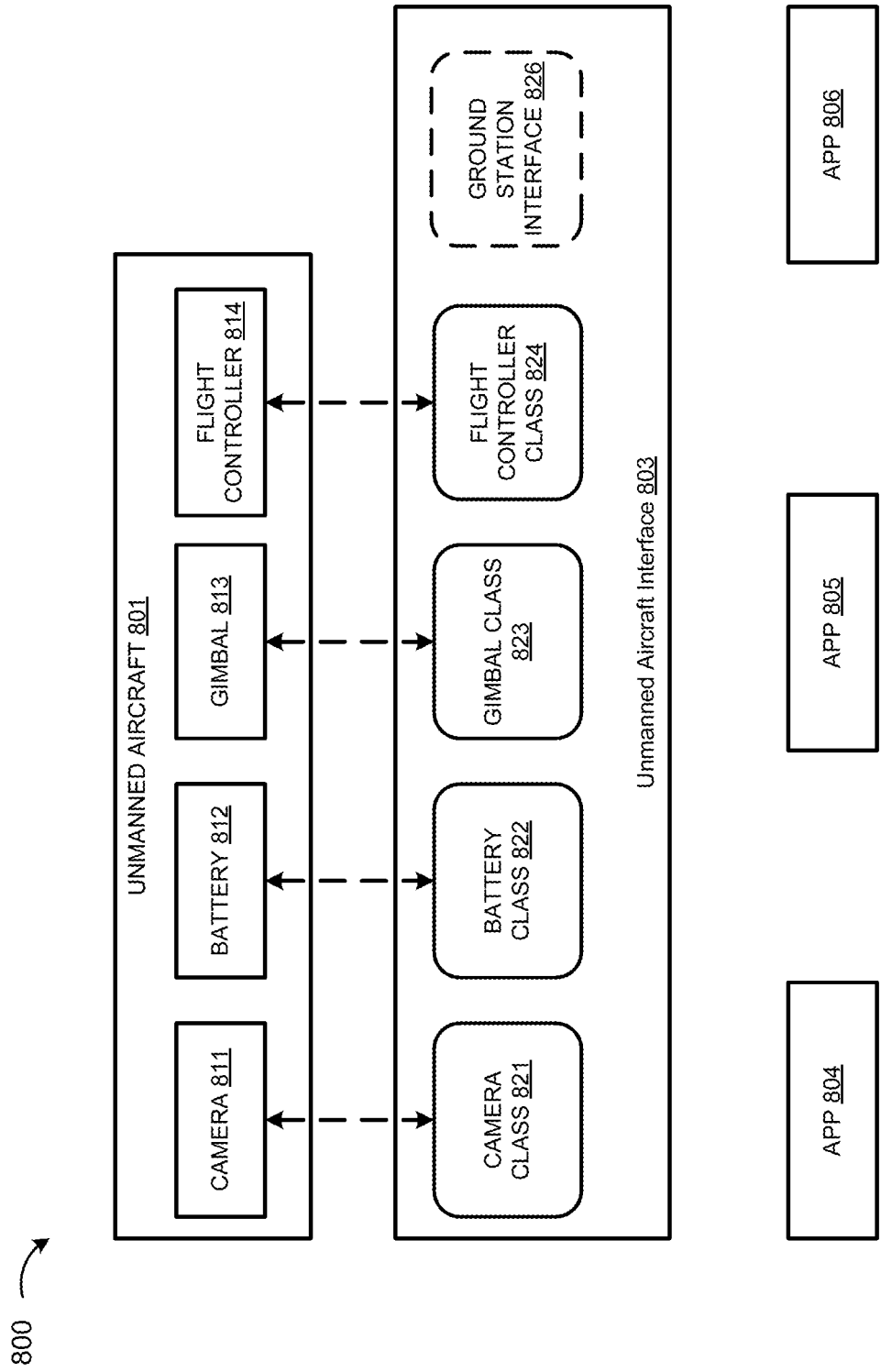
FIG. 8 illustrates an example of an unmanned aircraft interface, in accordance with various embodiments of the present invention.

FIG. 8 illustrates an example of an unmanned aircraft interface, in accordance with various embodiments. As shown in FIG. 8, an unmanned aircraft interface 803 can represent an unmanned aircraft 801. Thus, the applications, e.g. APPs 804-707, in the unmanned aircraft environment 800 can access and control the unmanned aircraft 801. As discussed, these apps may include an inspection app 804, a viewing app 805, and a calibration app 806.

For example, the unmanned aircraft 801 can include various modules, such as a camera 811, a battery 812, a gimbal 813, and a flight controller 814.

Correspondently, the movable object interface 803 can include a camera component 821, a battery component 822, a gimbal component 823, and a flight controller component 824.

Additionally, the movable object interface 803 can include a ground station component 826, which is associated with the flight controller component 824. The ground station component operates to perform one or more flight control operations, which may require a high-level privilege.

Figure 9:
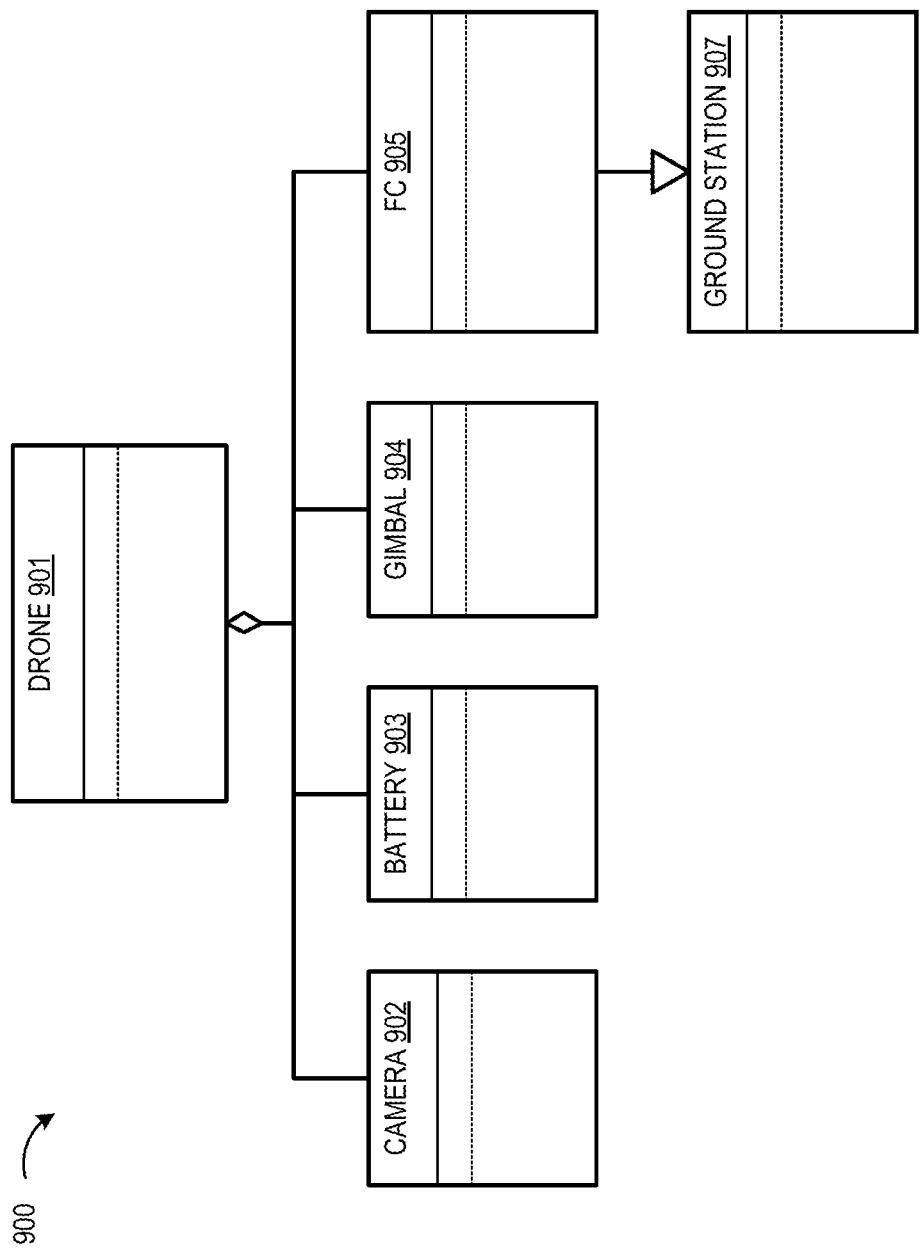
FIG. 9 illustrates an example of components for an unmanned aircraft in a software development kit (SDK), in accordance with various embodiments of the present invention.

FIG. 9 illustrates an example of components for an unmanned aircraft in a software development kit (SDK), in accordance with various embodiments. The SDK may correspond to all or a portion of the onboard data manager or mobile data manager described above. As shown in FIG. 9, the drone class 901 in the SDK 900 is an aggregation of other components 902-807 for an unmanned aircraft (or a drone). The drone class 901, which have access to the other components 902-807, can exchange information with the other components 902-807 and controls the other components 902-807.

In accordance with various embodiments, an application may be accessible to only one instance of the drone class 901. Alternatively, multiple instances of the drone class 901 can present in an application.

In the SDK, an application can connect to the instance of the drone class 901 in order to upload the controlling commands to the unmanned aircraft. For example, the SDK may include a function for establishing the connection to the unmanned aircraft. Also, the SDK can disconnect the connection to the unmanned aircraft using an end connection function. After connecting to the unmanned aircraft, the developer can have access to the other classes (e.g. the camera class 902 and the gimbal class 904). Then, the drone class 901 can be used for invoking the specific functions, e.g. providing access data which can be used by the flight controller to control the behavior, and/or limit the movement, of the unmanned aircraft.

In accordance with various embodiments, an application can use a battery class 903 for controlling the power source of an unmanned aircraft. Also, the application can use the battery class 903 for planning and testing the schedule for various flight tasks.

As battery is one of the most restricted elements in an unmanned aircraft, the application may seriously consider the status of battery not only for the safety of the unmanned aircraft but also for making sure that the unmanned aircraft can finish the designated tasks. For example, the battery class 903 can be configured such that if the battery level is low, the unmanned aircraft can terminate the tasks and go home outright.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 902 for defining various operations on the camera in a movable object, such as an unmanned aircraft. For example, in SDK, the Camera Class includes functions for receiving media data in SD card, getting & setting photo parameters, taking photo and recording videos.

An application can use the camera class 902 for modifying the setting of photos and records. For example, the SDK may include a function that enables the developer to adjust the size of photos taken. Also, an application can use a media class for maintaining the photos and records.

In accordance with various embodiments, an application can use a gimbal class 904 for controlling the view of the unmanned aircraft. For example, the Gimbal Class can be used for configuring an actual view, e.g. setting a first personal view of the unmanned aircraft. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 905 for providing various flight control information and status about the unmanned aircraft. As discussed, the flight controller class can include functions for receiving and/or requesting access data to be used to control the movement of the unmanned aircraft across various regions in an unmanned aircraft environment.

Using the Main Controller Class, an application can monitor the flight status, e.g. using instant messages. For example, the callback function in the Main Controller Class can send back the instant message every one thousand milliseconds (1000 ms).

Furthermore, the Main Controller Class allows a user of the application to investigate the instance message received from the unmanned aircraft. For example, the pilots can analyze the data for each flight in order to further improve their flying skills.

In accordance with various embodiments, an application can use a ground station class 907 to perform a series of operations for controlling the unmanned aircraft.

For example, the SDK may require applications to have a SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the unmanned aircraft.

Figure 10:
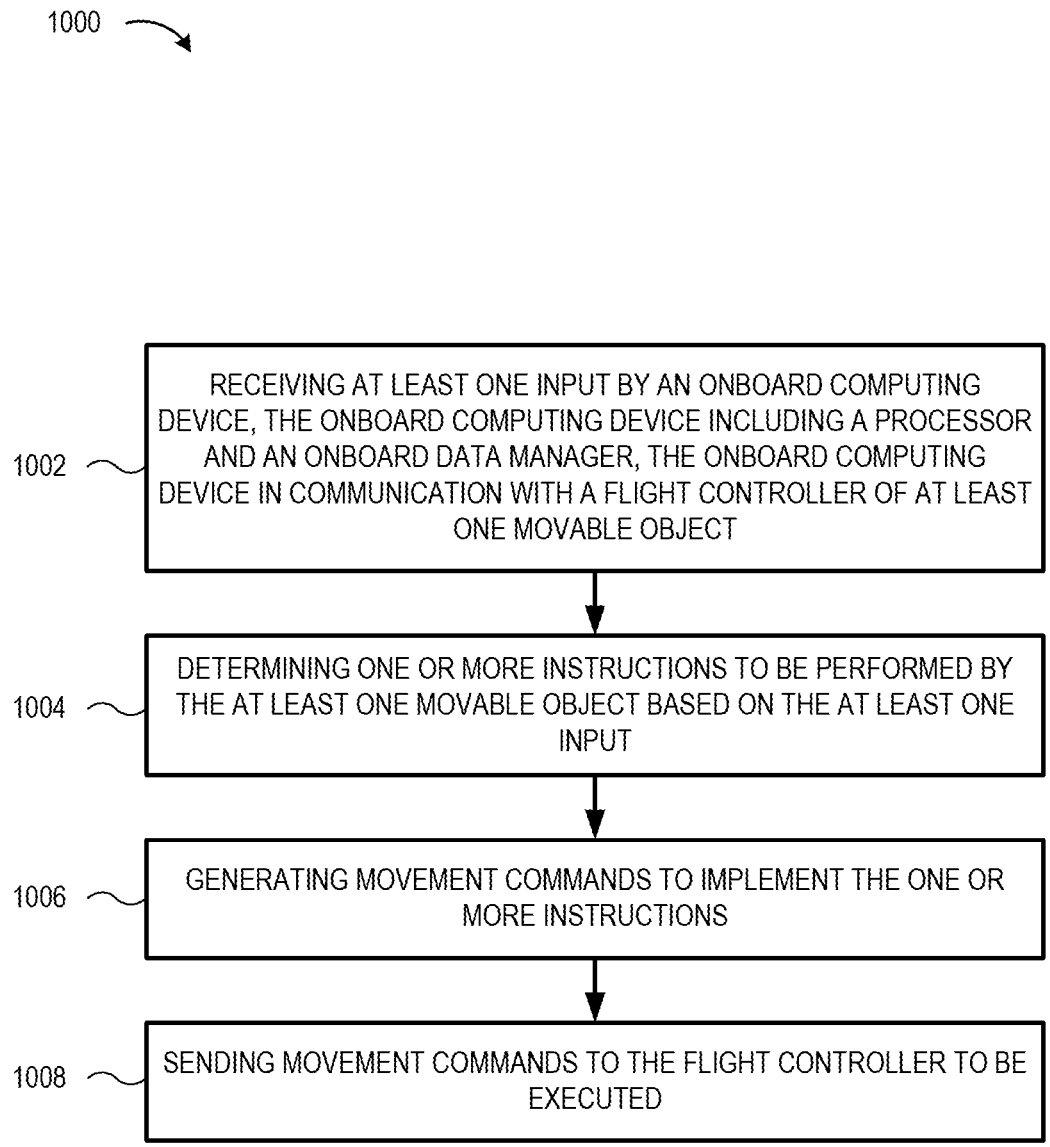
FIG. 10 shows a flowchart of communication management in a movable object environment, in accordance with various embodiments of the present invention.

FIG. 10 shows a flowchart 1000 of communication management in a movable object environment, in accordance with various embodiments. At 1002, at least one input can be received by an onboard computing device, the onboard computing device including a processor and an onboard data manager, the onboard computing device in communication with a flight controller of at least one movable object.

At 1004, one or more instructions to be performed by the at least one movable object can be determined based on the at least one input. In some embodiments, the at least one input includes a data stream of a plurality of waypoint definitions, wherein a plurality of waypoints corresponding to the plurality of waypoint definitions is added to an existing mission during execution of the existing mission. Each waypoint definition can include a waypoint and at least one of an acceleration constraint, a velocity constraint, a path type, or at least one action definition, the at least one action definition including a callback function. In some embodiments, the path type includes one of: a path calculated for reduced energy consumption to a next waypoint; or a path calculated for reduced time to the next waypoint.

At 1006, movement commands to implement the one or more instructions can be generated. At 1008, the movement commands can be sent to the flight controller to be executed. In some embodiments, a yaw command, a pitch command, and a roll command can be calculated based on a difference between the current position of the at least one movable object and the position defined by the next waypoint, and the flight controller converts the yaw command, the pitch command, and the roll command into a plurality of motor controls to perform the one or more instructions.

In some embodiments, a modified waypoint definition can be received for at least one waypoint in the existing mission; and the at least one waypoint can be updated using the modified waypoint definition.

In some embodiments, an indication that a first waypoint has been reached can be received and the callback function included in a first waypoint definition associated with the first waypoint can be executed.

In some embodiments, a current position of the at least one movable object can be determined using a positioning system. A difference between the current position of the at least one movable object and the position defined by a next waypoint can be determined, and the movement commands can be generated based on the difference between the current position of the at least one movable object and the position defined by a next waypoint. In some embodiments, the positioning system includes one of a global navigation system or a local positioning system configuring to provide the current position of the at least one movable object using LiDAR, computer vision, or motion capture.

In some embodiments, a position of a first waypoint and a position of a second waypoint can be determined. A difference between the position of the first waypoint and the position of the second waypoint can be determined and second movement commands can be generated based on the difference between the position of the first waypoint and the position of the second waypoint. The second movement commands can be sent to the flight controller upon determining the at least one movable object has reached the first waypoint.

In some embodiments, at least one waypoint can be received from a mobile data manager executing on a client device, the client device configured to receive data for the at least one waypoint through a graphical user interface. In some embodiments, a batch of modified waypoint definitions can be received from the mobile data manager executing on the client device.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A system for communicating instructions in a movable object environment, comprising:
    at least one movable object including
        a flight controller,
        a positioning system, and
        a communication system;
    an onboard computing device in communication with the flight controller, the computing device including a processor and an onboard data manager, the onboard data manager including instructions which, when executed by the processor, cause the onboard data manager to:
        determine a current position of the at least one movable object using the positioning system during executing an existing mission;
        receive at least one input including a modified waypoint definition for at least one waypoint in the existing mission;
        update the at least one waypoint using the modified waypoint definition;
        determine a difference between the current position of the at least one movable object and a position defined by a next waypoint, which is one of the at least one waypoint corresponding to the modified waypoint definition; and
        generate movement commands, including one or more of a yaw command, a pitch command, and a roll command, based on the difference between the current position of the at least one movable object and the position defined by the next waypoint; and
        send the movement commands to the flight controller to be executed, wherein the flight controller converts the movement commands into a plurality of motor controls.

2. The system of claim 1, wherein the instructions, when executed, further cause the onboard data manager to:
    determine one or more instructions to be performed by the at least one movable object based on the at least one input;
    generate the movement commands to implement the one or more instructions.

3. The system of claim 2, wherein the at least one input includes a data stream of a plurality of waypoint definitions, wherein a plurality of waypoints corresponding to the plurality of waypoint definitions is added to an existing mission during execution of the existing mission.

4. The system of claim 3, wherein each waypoint definition includes a waypoint and at least one of:
    an acceleration constraint;
    a velocity constraint;
    a path type;
    a roll, pitch, or yaw constraint; or
    at least one action definition, the at least one action definition including a callback function.

5. The system of claim 4, wherein the instructions, when executed, further cause the onboard data manager to:
    receive an indication that a first waypoint has been reached; and
    execute the callback function included in a first waypoint definition associated with the first waypoint.

6. The system of claim 1, wherein the instructions, when executed, further cause the onboard data manager to:
    determine a position of a first waypoint and a position of a second waypoint;
    determine a difference between the position of the first waypoint and the position of the second waypoint;
    generate second movement commands based on the difference between the position of the first waypoint and the position of the second waypoint; and
    send the second movement commands to the flight controller upon determining the at least, one movable object has reached the first waypoint.

7. A method for communicating instructions in a movable object environment, comprising:
- determining a current position of at least one movable object using a positioning system during executing an existing mission;
- receiving at least one input including a modified waypoint definition for at least one waypoint in the existing mission;
- updating the at least one waypoint using the modified waypoint definition;
- determining a difference between the current position of the at least one movable object and a position defined by a next waypoint, which is one of the at least one waypoint corresponding to the modified waypoint definition; and
- generating movement commands, including one or more of a yaw command, a pitch command, and a roll command, based on the difference between the current position of the at least one movable object and the position defined by the next waypoint; and
- sending the movement commands to the flight controller to be executed, wherein the flight, controller converts the movement commands into a plurality of motor controls.

8. The method of claim 7, further comprising:
- determining one or more instructions to be performed by the at least one movable object based on the at least one input;
- generating the movement commands to implement the one or more instructions.

9. The method of claim 8, wherein the at least one input includes a data stream of a plurality of waypoint definitions, wherein a plurality of waypoints corresponding to the plurality of waypoint definitions is added to an existing mission during execution of the existing mission.

10. The method of claim 9, wherein each waypoint definition includes a waypoint and at least one of:
- an acceleration constraint;
- a velocity constraint;
- a path type;
- a roll, pitch, or yaw constraint; or
- at least one action definition, the at least one action definition including a callback function.

11. The method of claim 10, further comprising:
- receiving an indication that a first waypoint has been reached; and
- executing the callback function included in a first waypoint definition associated with the first waypoint.

12. The method of claim 7, further comprising:
- determining a position of a first waypoint and a position of a second waypoint;
- determining a difference between the position of the first waypoint and the position of the second waypoint;
- generating second movement commands based on the difference between the position of the first waypoint and the position of the second waypoint; and
- sending the second movement commands to the flight controller upon determining the at least one movable object has reached the first waypoint.

13. A non-transitory computer readable storage medium including instructions stored thereon which, when executed by one or more processors, cause the one or more processors to:
- determine a current position of at least, one movable object using a positioning system during executing an existing mission;
- receive at least one input including a modified waypoint definition for at least one waypoint in the existing mission;
- update the at least one waypoint using the modified waypoint definition;
- determine a difference between the current position of the at least one movable object and a position defined by a next waypoint, which is one of the at least one waypoint corresponding to the modified waypoint definition; and
- generate movement commands, including one or more of a yaw command, a pitch command, and a roll command, based on the difference between the current position of the at least one movable object and the position defined by the next waypoint; and
- send the movement commands to the flight controller to be executed, wherein the flight controller converts the movement commands into a plurality of motor controls.

14. The non-transitory computer readable storage medium of claim 13, wherein the instructions, when executed, further cause the onboard data manager to:
- determine one or more instructions to be performed by the at least one movable object based on the at least one input;
- generate the movement commands to implement the one or more instructions.

15. The non-transitory computer readable storage medium of claim 14, wherein the at least one input includes a data stream of a plurality of waypoint definitions, wherein a plurality of waypoints corresponding to the plurality of waypoint definitions is added to an existing mission during execution of the existing mission.

16. The non-transitory computer readable storage medium of claim 15, wherein each waypoint definition includes a waypoint and at least one of:
- an acceleration constraint;
- a velocity constraint;
- a path type;
- a roll, pitch, or yaw constraint; or
- at least one action definition, the at least one action definition including a callback function.

17. The non-transitory computer readable storage medium of claim 16, wherein the instructions, when executed, further cause the onboard data manager to:
- receive an indication that a first waypoint has been reached; and
- execute the callback function included in a first waypoint definition associated with the first waypoint.

* * * * *